(12) United States Patent
Kanou

(10) Patent No.: US 7,027,217 B2
(45) Date of Patent: Apr. 11, 2006

(54) OPTICAL PULSE GENERATOR AND OPTICAL PULSE TESTING INSTRUMENT AND METHOD

(75) Inventor: Eiji Kanou, Tokyo (JP)

(73) Assignee: Advantest Corp., Tokyo (JP)

( * ) Notice: Subject to any disclaimer, the term of this patent is extended or adjusted under 35 U.S.C. 154(b) by 106 days.

(21) Appl. No.: 10/381,575

(22) PCT Filed: Oct. 11, 2001

(86) PCT No.: PCT/JP01/08917

§ 371 (c)(1),
(2), (4) Date: Jul. 28, 2003

(87) PCT Pub. No.: WO02/35200

PCT Pub. Date: May 2, 2002

(65) Prior Publication Data

US 2004/0037494 A1 Feb. 26, 2004

(30) Foreign Application Priority Data

Oct. 13, 2000 (JP) ............................. 2000-313691

(51) Int. Cl.
*H04B 10/12* (2006.01)

(52) U.S. Cl. ................ 359/341.3; 359/337; 359/337.1; 359/337.11; 359/337.13; 359/341.1; 359/341.2; 356/73.1

(58) Field of Classification Search ................ 359/337, 359/337.1, 337.11, 337.13, 341.1–341.13; 398/37; 356/73.1; 250/227.21, 227.22; 385/140, 88, 12

See application file for complete search history.

(56) References Cited

U.S. PATENT DOCUMENTS

| | | | | |
|---|---|---|---|---|
| 5,233,619 A | * | 8/1993 | Furuhashi et al. | 372/6 |
| 5,309,455 A | * | 5/1994 | Adachi et al. | 372/25 |
| 5,500,762 A | * | 3/1996 | Uchiyama et al. | 359/326 |
| 5,561,551 A | * | 10/1996 | Iwasaki et al. | 359/337 |
| 5,699,371 A | * | 12/1997 | Handa et al. | 372/6 |
| 6,078,422 A | * | 6/2000 | Kosaka et al. | 359/341.3 |
| 6,101,021 A | * | 8/2000 | Kumagai et al. | 359/237 |
| 6,233,091 B1 | * | 5/2001 | Kosaka et al. | 359/341.1 |
| 6,262,835 B1 | * | 7/2001 | Kosaka et al. | 359/337.12 |
| 6,721,089 B1 | * | 4/2004 | Miller et al. | 359/341.3 |

FOREIGN PATENT DOCUMENTS

| | | |
|---|---|---|
| JP | 5-21880 | 1/1993 |
| JP | 6-249750 | 9/1994 |
| JP | 6-332020 | 12/1994 |
| JP | 7-306423 | 11/1995 |
| JP | 10-332584 | 12/1998 |

* cited by examiner

Primary Examiner—Frank G. Font
Assistant Examiner—Ryan Lepisto
(74) Attorney, Agent, or Firm—Muramatsu & Associates

(57) ABSTRACT

An optical pulse testing apparatus incorporating an optical pulse generator composed of low cost components. The optical pulse testing apparatus comprises: a ring optical path including an optical fiber 30 with a rare earth element added to; an excitation light source 32 which enters excitation optical pulses into the optical fiber 30; an optical branching filter 38 for branching the circulating optical pulses circulating through the ring optical path to emit output optical pulses; and a photodetector 40 for detecting the circulating optical pulses circulating through the ring optical path to obtain signals indicative of a light intensity and a generation timing of the circulating optical pulses. Thus, the optical pulse generator, and the optical pulse testing apparatus and method using the optical pulse generator require no expensive optical parts and complicated device control.

12 Claims, 11 Drawing Sheets

OPTICAL PULSE GENERATOR AND OPTICAL PULSE TESTING INSTRUMENT AND METHOD

This application claims the benefit of foreign filing priority under 35 U.S.C. 109(e) based on Japanese Patent Application No. 2000-313691, filed Oct. 13, 2000.

FIELD OF THE INVENTION

The present invention relates to an optical pulse generator which is usable as a pulse light source of an optical pulse testing apparatus, and an optical pulse testing apparatus using the optical pulse generator and an optical pulse testing method.

BACKGROUND ART

Broken points of optical fiber cables, distributions of transmission losses, coupling losses, etc. can be measured by an optical pulse testing apparatus (OTDR; Optical Time Domain Reflectometer).

The structure of a conventional optical pulse testing apparatus will be explained with reference to FIG. 8. FIG. 8 is a block diagram of the structure of the optical pulse testing apparatus.

The conventional optical pulse testing apparatus includes a semiconductor laser 100 as a means for generating optical pulses as a probe. The semiconductor laser 100 is connected to a pulse generating circuit 102 which operates so that the semiconductor laser 100 outputs optical pulses at a predetermined cycle. The semiconductor laser 100 has the output connected to an optical fiber-to-be-measured 104 via a directional coupler 108 and an input/output connector 106. The directional coupler 108 is connected to a photodetector 110 which detects returning light reflected from the optical fiber 104. The photodetector 110 is connected to an amplifier 112 which amplifies electric signals from the photodetector 110. The amplifier 112 is connected to an A-D converter 114 which converts electric signals amplified by the amplifier 112 to digital signals. The A-D converter 114 is connected to a computer circuit 116 which computes digital signals supplied by the A-D converter 114. The computer circuit 116 includes a display 118 which indicates measured results given by the computer circuit 116. The A-D converter 114 and the computer circuit 116 are connected to a timing circuit 120 to be controlled by the timing circuit 120.

Then, the principle of the measuring of the optical pulse testing apparatus will be explained with reference to FIG. 8.

First, the timing circuit 120 inputs trigger signals to the pulse generating circuit 102. In response to the trigger signals, the pulse generating circuit 102 generates pulse currents for driving the semiconductor laser 100. The semiconductor laser 100 is controlled by the pulse currents from the pulse generating circuit 102 to output optical pulses of a predetermined pulse width and a predetermined cycle. Optical pulses emitted by the semiconductor laser 100 are supplied to the optical fiber-to-be-measured 104 connected to the input/output connector 106 via the directional coupler 108.

Optical pulses incident on the optical fiber-to-be-measured 104 propagate in the optical fiber-to-be-measured 104. Reflected light due to mismatching of the transmission paths at the coupling points of the optical fiber-to-be-measured 104, back scattering light, such as Rayleigh scattering light caused by trivial a small amount of disuniformity in the optical fiber-to-be-measured 104 returns to the optical pulse testing apparatus. A time from the incidence of an optical pulse on the optical fiber-to-be-measured 104 till the return of the optical pulse to the optical pulse testing apparatus is proportional to a distance from the end of the optical fiber-to-be-measured 104 into which the optical pulse was introduced to a reflection point or a scattering point of the optical fiber 104.

The light which has returned from the input/output connector 106 to the optical pulse testing apparatus is detected by the photodetector 110 via the directional coupler 108 and converted to electric signals. The converted electric signal is amplified by the amplifier 112, then converted to digital signals by the A-D converter 114, based on signals from the timing circuit 120, and synchronously added at each cycle of the pulses by the computing circuit 116. Light propagating through an optical fiber exponentially attenuates. Therefore, the added signals are logarithmically transformed by the computer circuit 116. The measured results are presented on the display 118 in distances of the optical fiber-to-be-measured 104 proportional to periods of time on the horizontal axis and intensities of the reflected light or the scattering light on the vertical axis. Broken points of an optical fiber and loss distributions in the optical fiber can be thus measured.

In the above-described optical pulse testing apparatus, the means for generating pulses as the probe can be provided by a pulse excitation variable wavelength ring laser in place of the semiconductor laser 100.

An example of structure in such a pulse excitation variable wavelength ring laser is shown in FIG. 9. As shown in FIG. 9, the pulse excitation variable wavelength ring laser includes an optical fiber 122 doped with rare earth element (s) for photoamplification.

The optical fiber 122 has an excitation light source 124 which is disposed via an optical multiplexer 126 for exciting the optical fiber 122. The excitation light source 124 is connected to a light source driving circuit 134 to drive the excitation light source 124 at selected excitation intensities, selected time intervals and selected repetition frequencies.

In the variable wavelength ring laser of the structure shown in FIG. 9, after the excitation light source 124 is turned on by the light source driving circuit 134, the excitation of the optical fiber 122 is started; laser outputs are not obtained until a period of time in which the laser oscillation starts, and becomes CW (continuous wave) outputs of the CW excitation ring laser after a plurality of optical pulse series are temporarily generated during the transient period. FIG. 10A shows outputs of the variable wavelength ring laser whose excitation time of the excitation light source 124 is shortened and is optimized to produce single pulse outputs.

Structures of such variable wavelength ring laser which can produce single pulse outputs have been proposed. One example of the conventional variable wavelength ring lasers which can easily produce single pulse outputs will be explained with reference to FIG. 11.

The variable wavelength ring laser shown in FIG. 11 includes an optical switch 136 disposed between the optical branching filter 130 and the isolator 132 in addition to the structure of the variable wavelength ring laser shown in FIG. 9. The optical switch 136 is connected to an optical switch controller 138 for controlling the optical switch 136.

The optical switch 136 is turned on for a short period of time by the optical switch controller 138 and can generate optical pulses of high output power corresponding to a length of the optical fiber 122 and a concentration level of rare earth element(s) added (doped) to the optical fiber 122.

Single pulses as the outputs are taken out by the optical branching filter 130. The details are described in Japanese Patent Laid-Open Publication No. Hei 5-21880 (1993).

However, parameters, such as a peak intensity, a half-value width, a delay time, etc. of a single pulse output generated by the conventional pulse excitation variable wavelength ring laser shown in FIG. 9 are determined by a concentration ratio of rare earth element(s) added to the optical fiber 122, a length of the optical fiber 122, an excitation intensity of the excitation light source 124, a repetition frequency of an excitation pulse, an excitation pulse width, a branch ratio of the optical branching filter 130, an oscillation wavelength determined by the variable wavelength filter 128 and an overall length of the ring laser constituted by the above noted optical parts. Accordingly, an excitation intensity and an excitation pulse width of the excitation light source 124 must be controlled corresponding to intended wavelength, output and a repetition frequency, and a timing control of the optical pulse testing apparatus must be adjusted.

On the other hand, the use of the variable wavelength ring laser shown in FIG. 11 to simplify the timing control of the optical pulse testing apparatus requires the expensive optical switch 136 for generating optical pulses.

SUMMARY OF THE INVENTION

An object of the present invention is to provide an optical pulse generator which can be formed without using expensive optical parts and requires no complicated device control, and an optical pulse testing apparatus using the optical pulse generator and an optical pulse testing method.

In the above-described optical pulse generator, it is possible that the optical fiber excitation means stops supplying the excitation optical pulse to the optical fiber when the optical pulse detecting means detects the signal indicating a required light intensity or a required peak output of the circulating optical pulse.

The above-described object is also achieved by an optical pulse testing apparatus comprising: an optical pulse generator including a ring optical path with a rare earth element added to, an optical fiber excitation means for supplying an excitation optical pulse to the optical fiber for exciting the optical fiber, and an optical pulse branching means for branching the circulating optical pulse circulating through the ring optical path to emit a probe optical pulse, the optical pulse generator supplying the probe optical pulse to an optical fiber-to-be-measured; a reflected light detecting means for detecting a reflected light of the probe optical pulse that has been reflected while propagating through the optical fiber-to-be-measured; and an analyzing means for analyzing a light transmission state of the optical fiber-to-be-measured based on a detection result of the reflected light detection means; the optical pulse generator further comprising an optical pulse detecting means for detecting the circulating optical pulse which is circulating through the ring optical path to obtain a signal indicative of light intensity and generation timing of the circulating optical pulse; and the optical pulse testing apparatus further comprising a control means for controlling the timing of the analyzing means starting the analysis, based on a detected result of the optical pulse detecting means.

In the above-described optical pulse testing apparatus, it is possible that the optical fiber excitation means stops supplying the excitation optical pulse to the optical fiber when the optical pulse detecting means detects the signal indicating a required light intensity or a required peak output of the circulating optical pulse.

In the above-described optical pulse generator, it is possible that the optical fiber has a total length which permits at least a required pulse width of the output optical pulses, and the generator further comprises: an optical switch for controlling a pulse width of the output optical pulse; and an optical switch control means for controlling the operation of the optical switch, based on a detection result of the optical pulse detecting means, to make a pulse width of the output optical pulse a required width.

The above-described object is also achieved by an optical pulse testing apparatus comprising: an optical pulse generator including a ring optical path with a rare earth element added to, an optical fiber excitation means for entering an excitation optical pulse into the optical fiber for exciting the optical fiber, and an optical pulse branching means for branching the circulating optical pulse circulating through the ring optical path, so as to emit a probe optical pulse, the optical pulse generator entering the probe optical pulse into an optical fiber-to-be-measured; a reflected light detecting means for detecting a reflected light of the probe optical pulse entered into the optical fiber-to-be-measured, which (the probe optical pulse) has been reflected while propagating through the optical fiber-to-be-measured and exited at the end where the probe optical pulse was entered into the optical fiber-to-be-measured; and an analyzing means for analyzing a light transmission state of the optical fiber-to-be-measured, based on a detection result of the reflected light detection means, the optical pulse generator further comprising an optical pulse detecting means for detecting the circulating optical pulse which is circulating through the ring optical path, so as to obtain a signal indicative of light intensity and generation timing of the circulating optical pulse, and the optical pulse testing apparatus further comprising a control means for controlling the timing of the analyzing means starting the analysis, based on a detected result of the optical pulse detecting means.

In the above-described optical pulse testing apparatus, it is possible that the optical fiber excitation means stops entering the excitation optical pulse into the optical fiber when the optical pulse detecting means detects a required light intensity or a required peak output of the circulating optical pulse.

In the above-described optical pulse testing apparatus, it is possible that the apparatus further comprises: an optical switch for controlling a pulse width of the probe optical pulse; and an optical switch control means for synchronizing the operation of the optical switch and the emission of the excitation optical pulse by the optical fiber excitation means.

In the above-described optical pulse testing apparatus, it is possible that the optical fiber of the ring optical path has a total length which permits the probe optical pulse to have at least a required pulse width, and the apparatus further comprises: an optical switch for controlling a pulse width of the probe optical pulses; and a switch control means for controlling the operation of the optical switch to make a pulse width of the probe optical pulse is a required width, based on a detected result of the optical pulse detecting means.

The above-described object is also achieved by an optical pulse testing method comprising the steps of: supplying a probe optical pulse to an optical fiber-to-be-measured; detecting a reflected light of the probe optical pulse supplied to the optical fiber-to-be-measured that has been reflected while propagating through the optical fiber-to-be-measured; and analyzing a light transmission state of the optical fiber-to-be-measured based on a detection result of the reflected light, the excitation optical pulse being entered into a ring optical path including an optical fiber with a rare earth element added to excite the optical fiber, and the circulating optical pulse which is circulating through the ring optical path being branched as the probe optical pulse; the circulating optical pulse circulating through the ring optical path being detected; and a timing of starting the analysis of the light transmission state of the optical fiber-to-be-measured being controlled based on a detection result of the circulating optical pulse.

In the above-described optical pulse testing method, it is possible that the entry of the excitation optical pulse is stopped after a required light intensity or a peak output of the circulating optical pulse is detected.

In the above-described optical pulse testing method, it is possible that the control of a pulse width of the probe optical pulse and the entry of the excitation optical pulse are synchronized with each other.

In the above-described optical pulse testing method, it is possible that the optical fiber of the ring optical path has a total length which permits the probe optical pulse to have at least a required pulse width, and a pulse width of the probe optical pulse is controlled based on a detection result of the circulating optical pulse.

According to the present invention, in the optical pulse testing method comprising the steps of: supplying a probe optical pulse an optical fiber-to-be-measured; detecting reflected light of the probe optical pulse entered into the optical fiber-to-be-measured that has been reflected while propagating through the optical fiber-to-be-measured; and analyzing a light transmission state of the optical fiber-to-be-measured, based on a detection result of the reflected light, an excitation optical pulse is supplied to a ring optical path including an optical fiber with a rare earth element added to excite the optical fiber, and the circulating optical pulse which is circulating through the ring optical path is branched as the probe optical pulse; the circulating optical pulse circulating through the ring optical path is detected; and a timing of starting the analysis of a light transmission state of the optical fiber-to-be-measured is controlled based on a detection result of the circulating optical pulse. Thus, the optical pulse generator can be constituted without using expensive optical parts, and the light transmission state of the optical fiber-to-be-measured can be measured without requiring complicated device control.

DETAILED DESCRIPTION OF THE INVENTION

First Embodiment

Figure 1:
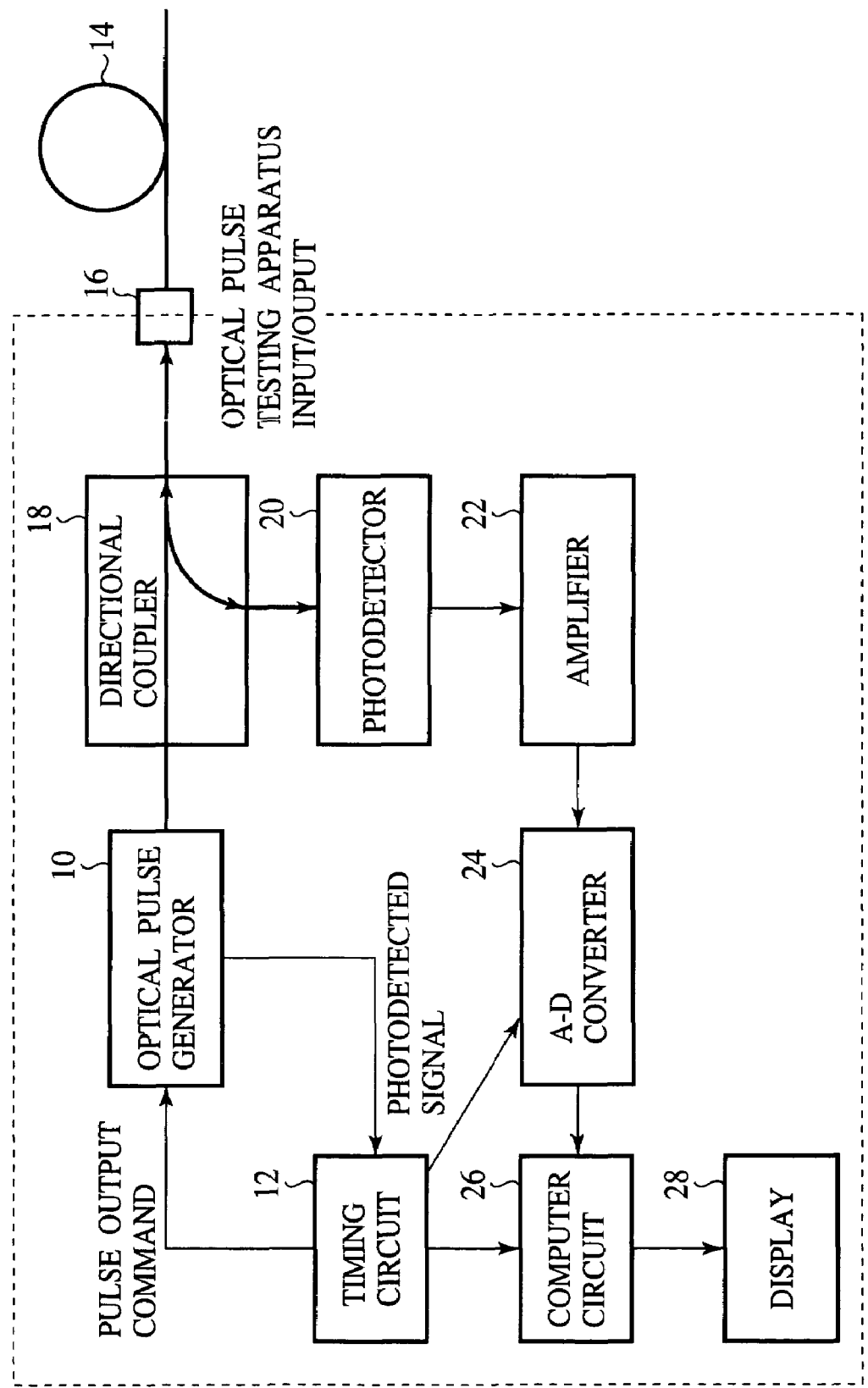
FIG. 1 is a block diagram of a structure of the optical pulse testing apparatus using the optical pulse generator according to a first embodiment of the present invention.
Figure 2:
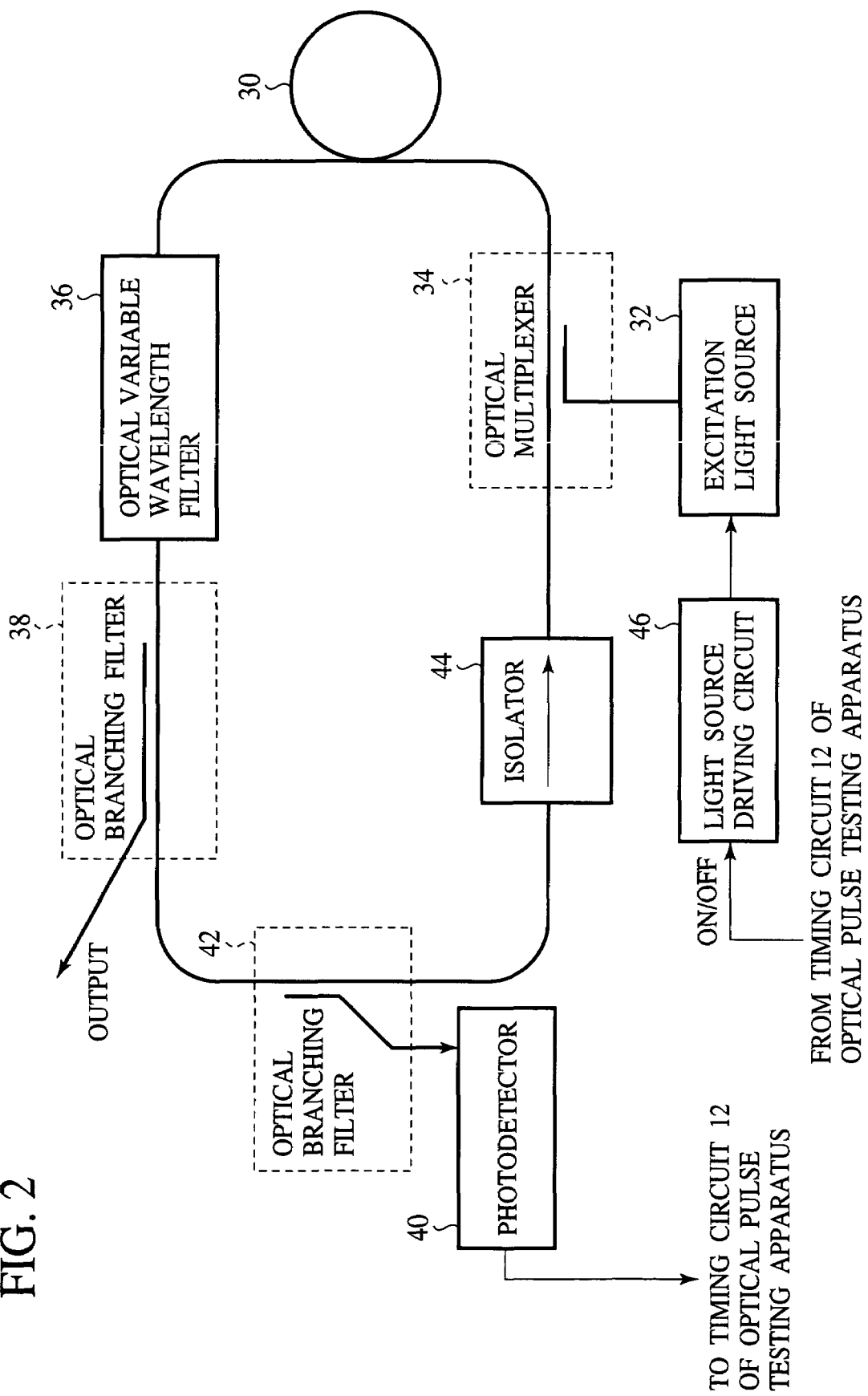
FIG. 2 is a block diagram of the structure of the optical pulse generator according to the first embodiment of the present invention.
Figure 3:
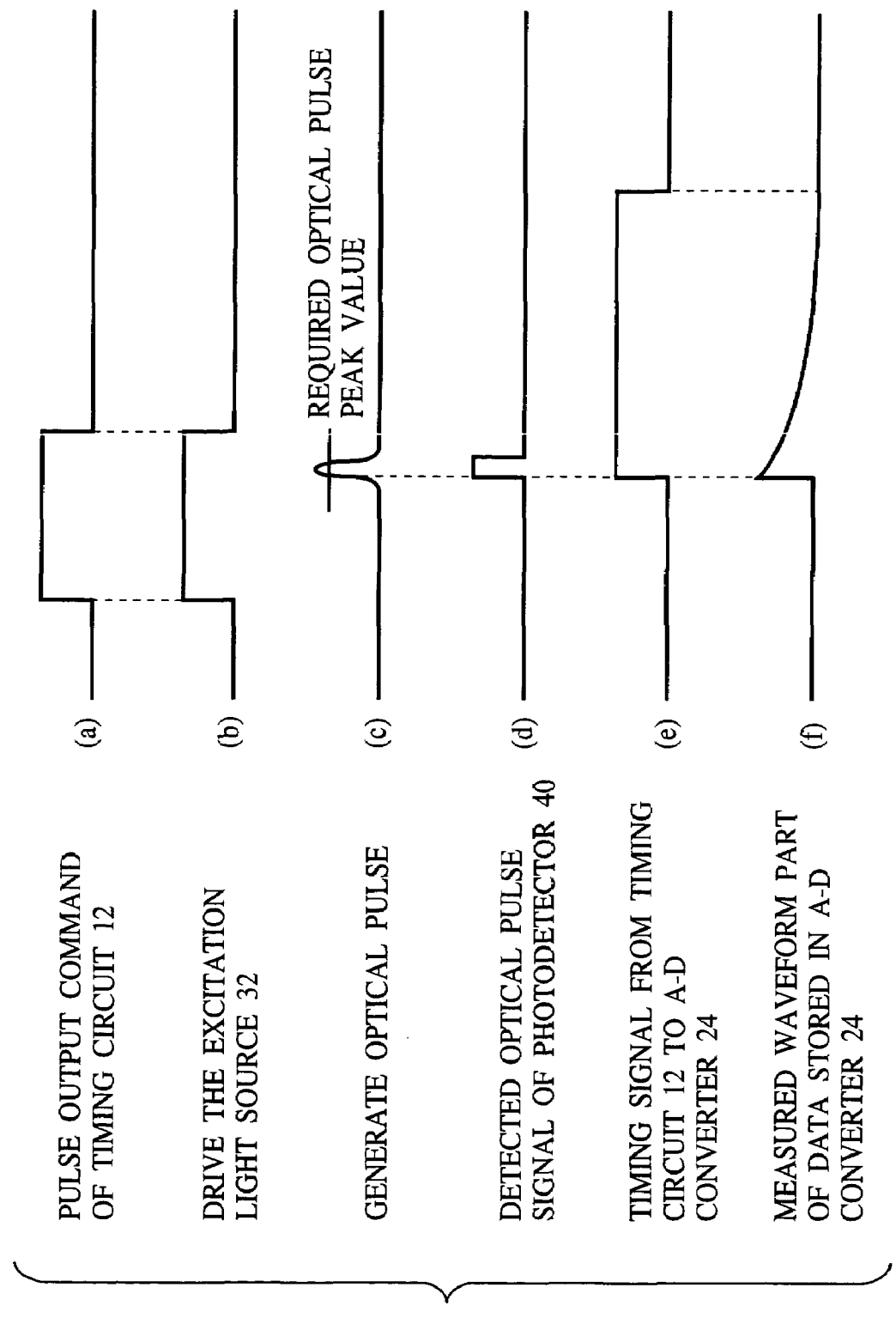
FIGS. 3(a)–3(f) are timing charts showing the control operations of the optical pulse testing apparatus using the optical pulse generator according to the first embodiment of the present invention.

The optical pulse generator according to a first embodiment of the present invention, and the optical pulse testing apparatus using the same and the optical pulse testing method will be explained with reference to FIGS. 1 to 3. FIG. 2 is a block diagram of a structure of the optical pulse generator. FIGS. 3(a)–3(f) are timing charts showing the control operations of the optical pulse testing apparatus.

First, the structure of the optical pulse testing apparatus according to the present embodiment will be explained with reference to FIG. 1.

The optical pulse generator 10 used as a pulse light source of the optical pulse testing apparatus is connected to a timing circuit 12 which drives the optical pulse generator 10. An optical fiber-to-be-measured 14 is connected to the output of the optical pulse generator 10 via a directional coupler 18 and an input/output connector 16. The directional coupler 18 is connected to a photodetector 20 which detects light which has been reflected in the optical fiber 14 and returned to the optical pulse testing apparatus. The photodetector 20 is connected to an amplifier 22 which amplifies electric signals from the photodetector 20. The amplifier 22 is connected to an A-D converter 24 which converts electric signals amplified by the amplifier 22 to digital signals. The A-D converter 24 is connected to a computer circuit 26 which computes digital signals given by received from the A-D converter 24. The computer circuit 26 has a display which displays measured results obtained by the computer circuit 26. A timing circuit 12 is connected to the A-D converter 24 and the computer circuit 26 to control the operation timings of the A-D converter 24 and the computer circuit 26.

Next, the structure of the optical pulse generator 10 mainly characterizing the optical pulse testing apparatus according to the present embodiment will be explained with reference to FIG. 2.

The optical pulse generator 10 according to the present embodiment has a ring optical fiber 30 with rare earth element(s) added for photoamplification. The optical fiber 30 is connected to an excitation light source 32 for exciting the optical fiber 30 via an optical multiplexer 34. The excitation light source 32 is connected to a light source driving circuit 46 which drives the excitation light source 32, based on signals from the timing circuit 12 of the optical pulse testing apparatus.

The optical fiber 30 includes an isolator 44 for determining a direction of light circulating through the optical fiber (ring optical path) 30, a variable wavelength filter 36 for determining an oscillation wavelength, and an optical branching filter 38 which emits optical pulses as outputs of the optical pulse generator.

The optical fiber 30 further includes an optical branching filter 42 which branches light circulating through the optical fiber 30. The optical branching filter 42 is connected to a photodetector 40 which detects light branched by the optical branching filter 42. The photodetector 40 is connected to the timing circuit 12 of the optical pulse testing apparatus.

The optical pulse generator 10 according to the present embodiment is based on the principle of the pulse excitation variable wavelength ring laser and emits optical pulses as a probe for measuring broken points of the optical fiber-to-be-measured 14 and loss distributions of coupling losses, etc. in the optical fiber-to-be-measured 14. The emission of optical pulses from the optical pulse generator 10 is performed in response to pulse output commands from the timing circuit 12.

Next, the operation of the optical pulse generator 10 as the pulse light source of the optical pulse testing apparatus will be detailed.

The light source driving circuit 46 of the optical pulse generator 10 drives the excitation light source 32 in response to pulse output commands from the timing circuit 12 of the optical pulse testing apparatus and emits optical pulses from the excitation light source 32. The optical pulses emitted by the excitation light source 32 are provided to the optical multiplexer 34. It is preferable to store information regarding combinations of excitation intensities and excitation pulse widths of single pulse outputs in an external memory (not shown), and, based on the information, the excitation light source 32 is driven.

The optical pulses emitted from the excitation light source 32 enter the optical fiber 30 via the optical multiplexer 34 and circulate through the optical fiber 30 to be amplified. A direction of the circulation of the optical pulses through the optical fiber 30 is determined by the isolator 44.

The variable wavelength optical filter 36 determines an oscillation wavelength of the optical pulse generator 10 as a ring laser and selectively passes a required wavelength component of the optical pulses circulating the optical fiber 30.

The optical pulses emitted by the excitation light source 32 circulate through the optical fiber 30, whereby the optical pulse generator 10 starts oscillation. At this time, a part of the optical pulses circulating through the optical fiber 30 is branched by the optical branching filter 38 to output the optical pulses from the optical pulse generator 10. Here, even when a pulse output command from the timing circuit 12 has arrived at the optical pulse generator 10, the emission of the optical pulses from the optical pulse generator 10 is delayed by a delay time depending on a repetition frequency, a wavelength and a temperature.

Similarly, a part of the optical pulses circulating through the optical fiber 30 is branched to the optical branching filter 42 to be supplied to the photodetector 40. The photodetector 40 detects the optical pulses circulating through the optical fiber 30 of the optical pulse generator 10. Detected signals of these optical pulses are received by the timing circuit 12 to be used for controlling the A-D converter 24 and the computer circuit 26.

As described above, the optical pulse generator 10 according to the present embodiment is characterized in that the detected optical pulse signals are transmitted to the timing circuit 12 of the optical pulse testing apparatus as control signals indicating timings of the emission of the output optical pulses from the optical branching filter 38.

The output optical pulses emitted by the optical branching filter 38 of the optical pulse generator 10 are entered into the optical fiber-to-be-measured 14 connected to the input/output connector 16 via the directional coupler 18 of the optical pulse testing apparatus. A part of the optical pulses entered into the optical fiber-to-be-measured 14 is reflected at broken points, etc. in the optical fiber-to-be-measured 14 and returns to the optical pulse testing apparatus via the input/output connector 16. The reflected light returning to the optical pulse testing apparatus is detected by the photodetector 20 via the directional coupler 18. Based on the results of the detection, light transmitting states of the optical fiber-to-be-measured 14 are measured.

The operation of the optical pulse testing apparatus according to the present embodiment will be explained with reference to FIGS. 1 and 3(a)–3(f).

The timing circuit 12 outputs timing signals to the A-D converter 24 and the computer circuit 26 based on the detected optical pulse signals received from the photodetector 40 of the optical pulse generator 10. Therefore, even when a delay time is present between an optical pulse output command to the light source driving circuit 46 and the output of optical pulses from the optical pulse generator 10, optical signals of returning light reflected in the optical fiber-to-be-measured 14 can be added synchronously at each cycle thereof. FIGS. 3(a)–3(f) are timing charts showing the control timings and waveforms by such the timing circuit 12.

First, the timing circuit 12 outputs an optical pulse output command shown in FIG. 3(a) to the light source driving circuit 46. Thus, the excitation light source 32 is driven at the timing shown in FIG. 3(b), and at the timing shown in FIG. 3(c), an output optical pulse is generated by the optical pulse generator 10. Subsequently, based on a detected optical pulse signal shown in FIG. 3(d) from the photodetector 40, the timing circuit 12 supplies a timing signal shown in FIG. 3(e) to the A-D converter 24 to drive the A-D converter 24.

Based on the above-described timing signal from the timing circuit 12, the A-D converter 24 starts to convert the photosignals detected by the photodetector 20 and amplified by the amplifier 22 to digital signals and store the data. FIG. 3(f) shows the measured waveform portion of the data stored by the A-D converter 24.

The computer circuit 26 performs synchronous addition of measured data received from the A-D converter 24 to compute measured result, such as broken points, distributions of transmission losses, etc. of the optical fiber-to-be-measured 14. The measured results obtained by the computer circuit 26 can be presented on the display 28.

The optical pulse testing apparatus according to the present embodiment is characterized in that the photodetector 40 for detecting optical pulses circulating through the optical fiber of the optical pulse generator 10 is provided, and based on the detected optical pulse signals of the photodetector 40, the timing circuit 12 controls the A-D converter 24 and the computing circuit 26.

Next, the optical pulse testing method according to the present embodiment will be explained with reference to FIGS. 1 to 3.

First, an optical fiber 14 to be measured about transmission states of light, such as transmission losses, broken points, etc. is connected to the input/output connector 16.

Then, the timing circuit 12 supplies a pulse output command shown in FIG. 3(a) to the light source driving circuit 46 of the optical pulse generator 10.

The excitation light source 32 is driven at the timing shown in FIG. 3(b) by the light source driving circuit 46 which has received the pulse output command from the timing circuit 12. Optical pulses generated by the excitation light source 32 are entered into the optical fiber 30 via the optical multiplexer 34.

The optical pulses entered into the optical fiber 30 circulate through the optical fiber 30 to be thereby amplified. The optical pulses being amplified by circulating through the optical fiber 30 have the wavelength component determined to be a required value by the variable wavelength filter 36.

Thus, the optical pulses circulate through the optical fiber 30 of the optical pulse generator 10, whereby the laser oscillation starts, and optical pulse outputs are produced from the optical branching filter 38 at the timing shown in FIG. 3(c). The emission of the optical pulses from the optical pulse generator 10 is delayed with respect to the pulse output command from the timing circuit 12 shown in FIG. 3(a) by a delay time depending on a repetition frequency, a wavelength and a temperature.

Concurrently, the optical pulses circulating through the optical pulse generator 10 are detected by the photodetector 40 via the optical branching filter 42. The detected signals from the photodetector 40 are shown in FIG. 3(d). The detected optical pulse signals are transmitted to the timing circuit 12. Based on the detected optical pulse signals, the timing circuit 12 controls the operation timings of the A-D converter 24 and the computer circuit 26.

A part of the optical pulses supplied to the optical fiber-to-be-measured 14 is reflected at broken points, etc. in the optical fiber-to-be-measured 14 and returned to the optical pulse testing apparatus via the input/output connector 16.

The optical pulses thus emitted by the optical branching filter 38 of the optical pulse generator 10 are entered into the optical fiber-to-be-measured 14 connected to the input/output connector 16 via the directional coupler 18.

A part of the photpulses entered into the optical fiber-to-be-measured 14 is reflected on broken points, etc. in the optical fiber-to-be-measured 14 and returns to the optical pulse testing apparatus again via the input/output connector 16.

The reflected light returning from the optical fiber-to-be-measured 14 is separated from the optical pulses emitted from the optical pulse generator 10 by the directional coupler 18, and detected by the photodetector 20.

Subsequently, the detected optical pulse signals from the photodetector 20 are amplified by the amplifier 22.

In the meantime, the timing circuit 12 transmits timing signals shown in FIG. 3(e) to the A-D converter 24 based on the detected optical pulse signals from the photodetector 40 shown in FIG. 3(d).

Based on the timing signals from the timing circuit 12 described above, the A-D converter 24 starts to convert the detected optical pulse signals from the photodetector 20 to digital signals as shown in FIG. 3(f) and store the digital data. Thus, even there is a delay time between a pulse output command from the timing circuit 12 to the light source driving circuit 46 and the emission of an optical pulse from the optical pulse generator 10, the optical pulses reflected in the optical fiber-to-be-measured 14 and returned to the optical pulse testing apparatus can be synchronously added at each one cycle of the pulses by the computing circuit 26.

Concurrently, the synchronous addition of the measured data stored in the A-D converter 24 is performed by the computer circuit 26 to compute measured results regarding the states of the light transmission, such as broken points, transmission losses, etc. of the optical fiber-to-be-measured 14. The computed results obtained by the computer circuit 26 are presented on the display 28. Thus, the measurement of the states of light transmission in the optical fiber by the optical pulse testing apparatus is finished.

As described above, according to the present embodiment, optical pulse generation in the optical pulse generator is detected, and based on the detection result, the optical pulse testing apparatus is controlled, which permits the optical pulse generator and optical pulse testing apparatus can be constituted without using expensive optical parts, and without complicated device control, states of light transmission of optical fibers can be measured.

Second Embodiment

Figure 4:
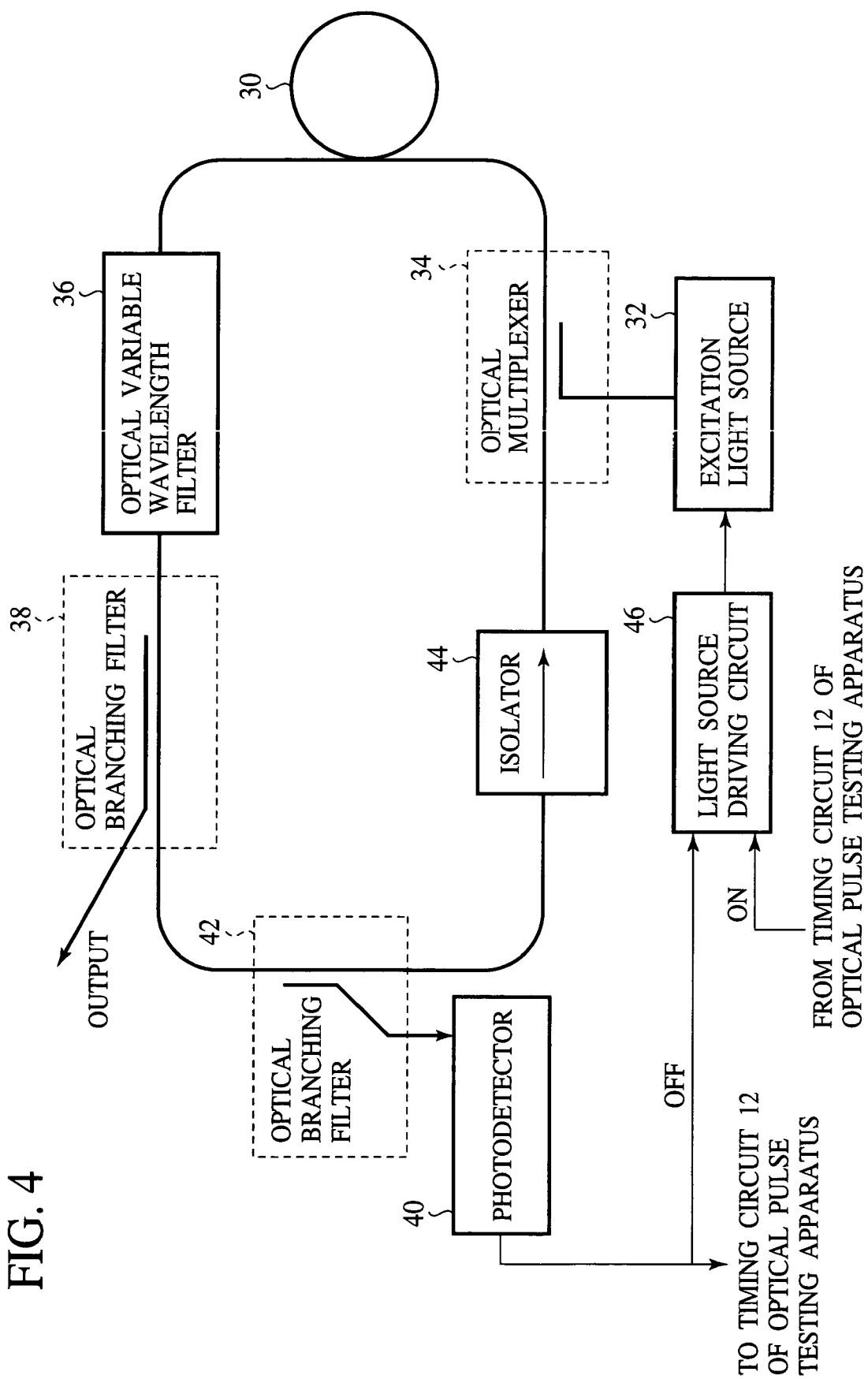
FIG. 4 is a block diagram of a structure of the optical pulse generator according to a second embodiment of the present invention.

The optical pulse generator, and the optical pulse testing apparatus and method according to a second embodiment of the present invention will be explained with reference to FIGS. 4 and 5(a)–5(f). FIG. 4 is a schematic diagram showing a structure of the optical pulse generator according to the present embodiment. FIGS. 5(a)–5(f) are timing charts of showing the control timings and waveforms of the optical pulse testing apparatus. The same members of the present embodiment as those of the optical pulse generator and the optical pulse testing apparatus according to the first embodiment are represented by the same reference numbers to simplify their explanation.

The structure of the optical pulse generator shown in FIG. 4 according to the present embodiment is substantially the same as that of the first embodiment, and the structure of the optical pulse testing apparatus is also the same. The optical pulse generator 10 according to the present embodiment is characterized in that a photodetector 40 is connected to a timing circuit 12 and a light source driving circuit 46. Thus, the signals of light circulating through an optical fiber 30, which have been detected by the photodetector 40, are supplied to both the timing circuit 12 and the light source driving circuit 46.

The operation of the optical pulse generator and the optical pulse testing apparatus according to the present embodiment will be explained below.

Figure 5:
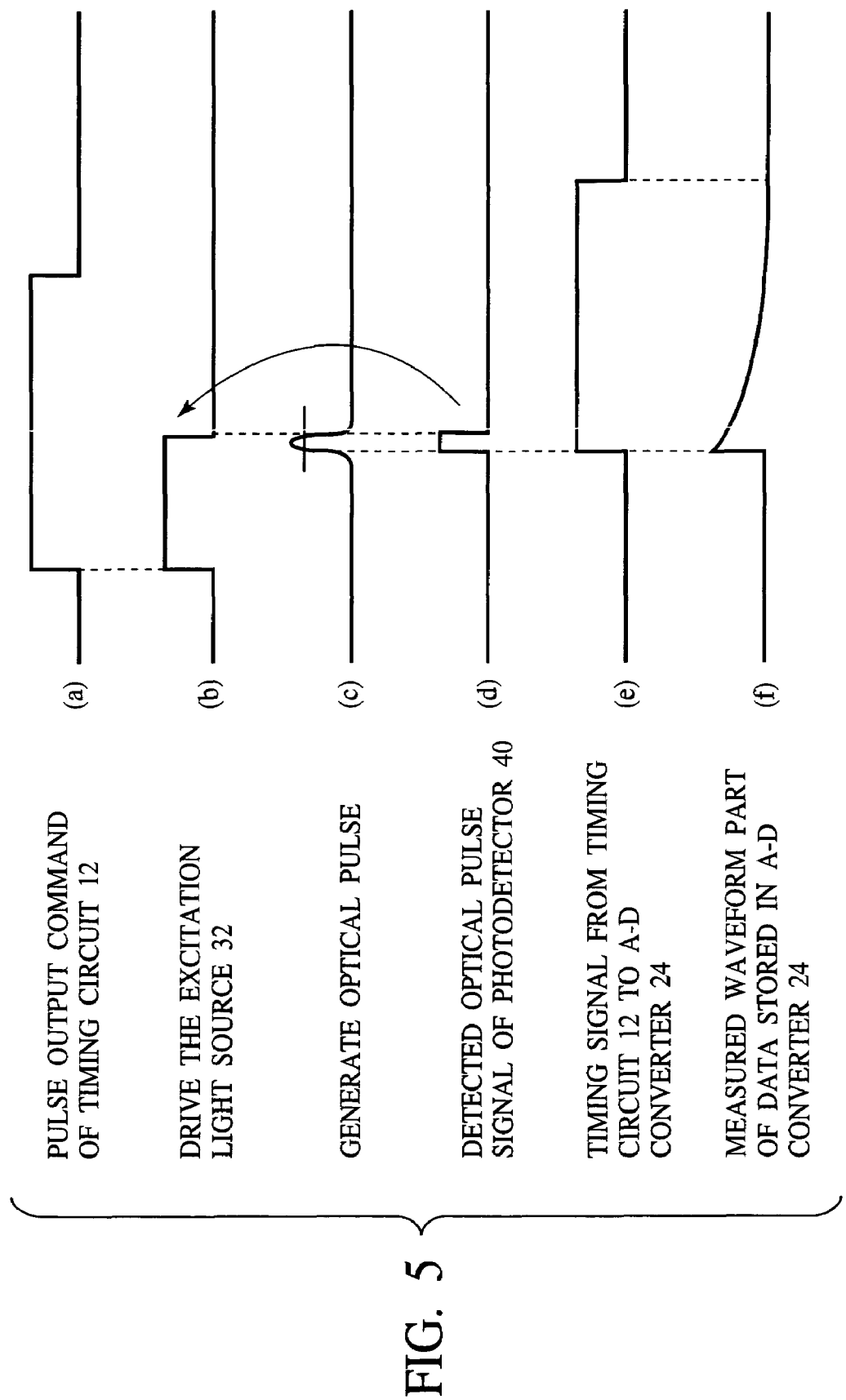
FIGS. 5(a)–5(f) are timing charts showing the control operations of the optical pulse testing apparatus using the optical pulse generator according to a second embodiment of the present invention.

First, the timing circuit 12 of the optical pulse testing apparatus supplies a pulse output command shown in FIG. 5(a) to the light source driving circuit 46 to start driving the excitation light source 32.

The excitation light source 32 driven by the light source driving circuit 46 emits excitation light, and the excitation light is supplied to the optical fiber 30 via the optical multiplexer 34 and circulates through the optical fiber 30 as in the first embodiment to start the oscillation of the laser.

During this time, the photodetector 40 detects via the optical branching filter 42 a part of the light circulating through the optical fiber 30 to constantly monitor signal intensities of the light circulating the through the ring laser (ring optical path). When a required pulse intensity or a maximum peak as shown in FIG. 5(d) is monitored, the drive of the excitation light source 32 is stopped. This makes it unnecessary to control the excitation light source 32 corresponding to a parameter of output pulses, such as an excitation pulse width or others, and a required single pulse output as shown in FIG. 5(c) can be easily obtained from the optical pulse generator 10.

By using the thus-obtained single pulses, the measurement of states of light transmission through the optical fiber-to-be-measured 14 can be performed in the same way as in the first embodiment.

As described above, according to the present embodiment, the optical pulse generation by the optical pulse generator is detected, and based on the result of the detection, the control of the optical pulse testing apparatus is performed. Thus, the optical pulse generator and the optical pulse testing apparatus can be constituted without using expensive optical parts and can perform the measurement of light transmission states of optical fibers without requiring complicated device control.

Third Embodiment

Figure 6:
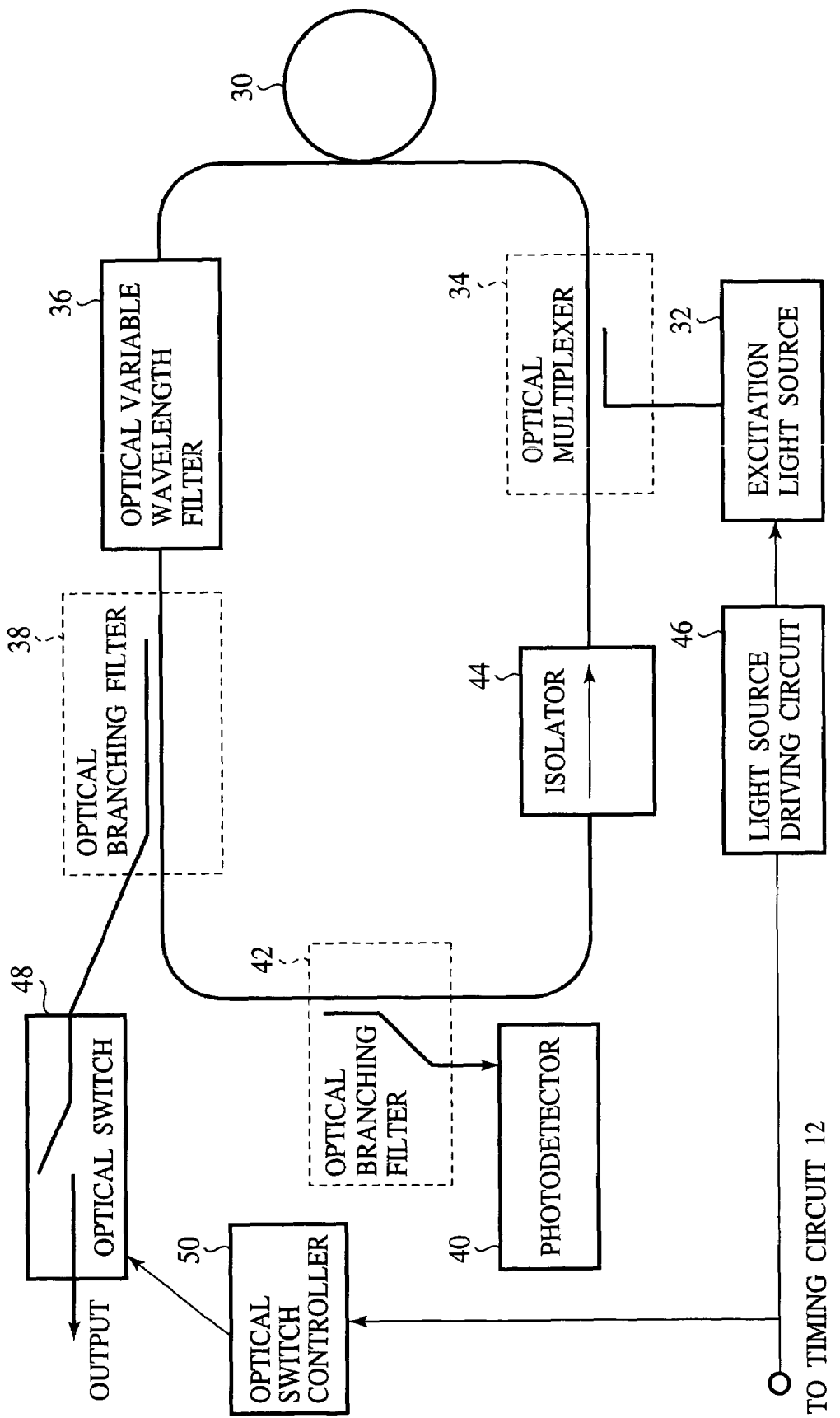
FIG. 6 is a block diagram of a structure of the optical pulse generator according to a third embodiment of the present invention.

The optical pulse generator, and the optical pulse testing apparatus and method according to a third embodiment of the present invention will be explained with reference to FIG. 6. FIG. 6 is a schematic diagram showing a structure of the optical pulse generator according to the present embodiment. The same members of the present embodiment as those of the optical pulse generator and the optical pulse testing apparatus according to the first embodiment are represented by the same reference numbers to simplify their explanation.

Optical pulses given by the optical pulse generator according to the first embodiment have output peaks which can be controlled by excitation intensities of the excitation light source 32, and output pulse frequencies which can be controlled by excitation pulse repetition frequencies of the excitation light source 32. However, an output pulse width is substantially determined by the optical parts constituting the optical pulse generator 10.

The optical pulse generator according to the present embodiment can control the output pulse width as well.

The structure of the optical pulse generator according to the present embodiment as shown in FIG. 6 is substantially the same as that of the first embodiment, and the structure of the optical pulse testing apparatus is the same as that of the first embodiment. The present embodiment further includes an optical switch 48 disposed on the output side of the optical branching filter 38 of the optical pulse generator 10. The optical switch 48 is connected to an optical switch controller 50. The optical switch controller 50 is connected to a timing circuit 12.

The optical pulse generator 10 has the above-described constitution, and operation timings of the optical switch 48 and the light source driving circuit 46 are synchronized, whereby the output pulse width of the optical pulse generator 10 can be controlled.

By using optical pulses having output pulse widths controlled, light transmission states of an optical fiber-to-be-measured 14 can be measured by the optical pulse testing apparatus.

As described above, according to the present embodiment, the optical pulse generation by the optical pulse generator is detected, and based on the result of the detection, the control of the optical pulse testing apparatus is performed. Thus, the optical pulse generator and the optical pulse testing apparatus can be constituted without using expensive optical parts and can perform the measurement of light transmission states of optical fibers without requiring complicated device control.

Fourth Embodiment

Figure 7:
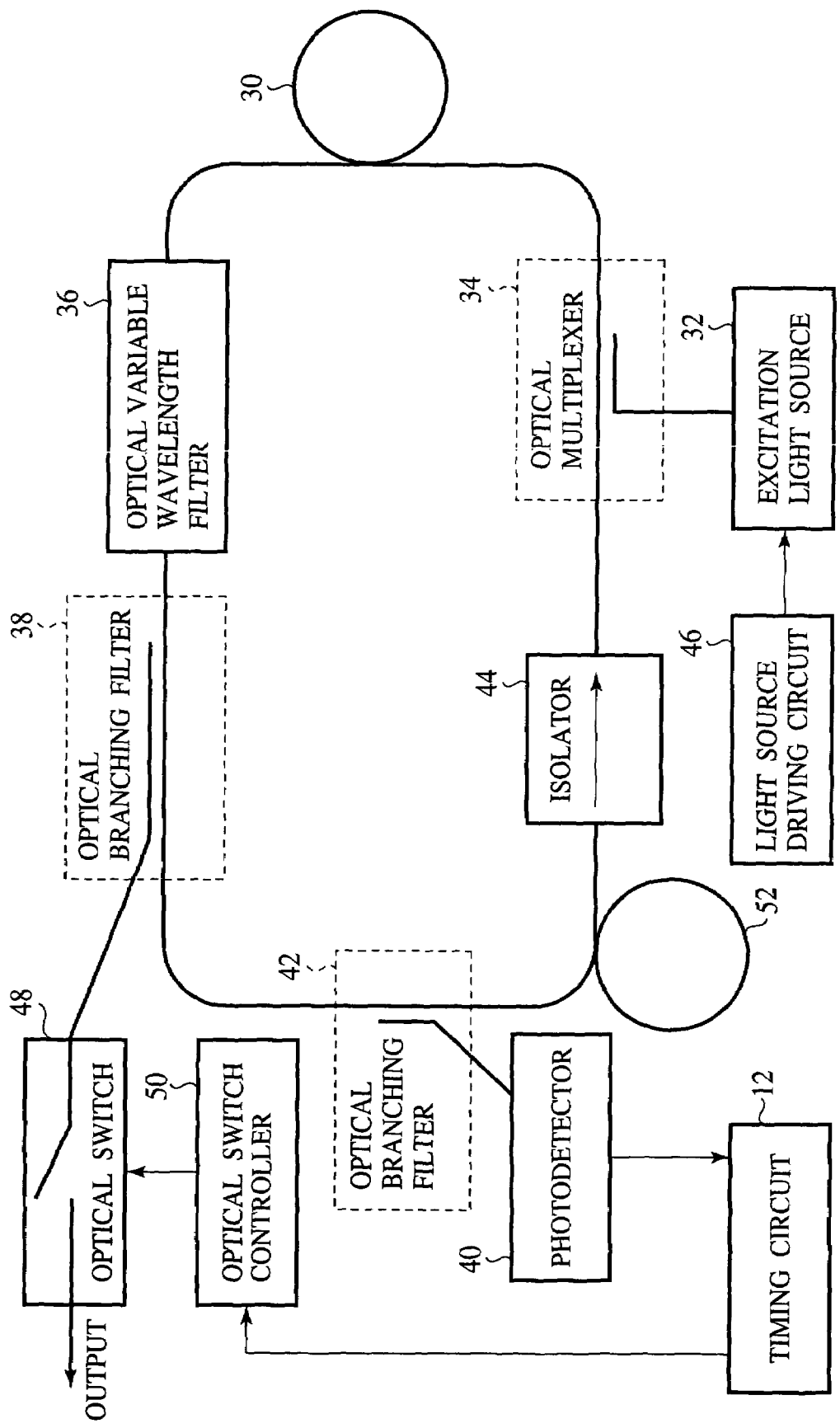
FIG. 7 is a block diagram of a structure of the optical pulse generator according to a fourth embodiment of the present invention.
Figure 8:
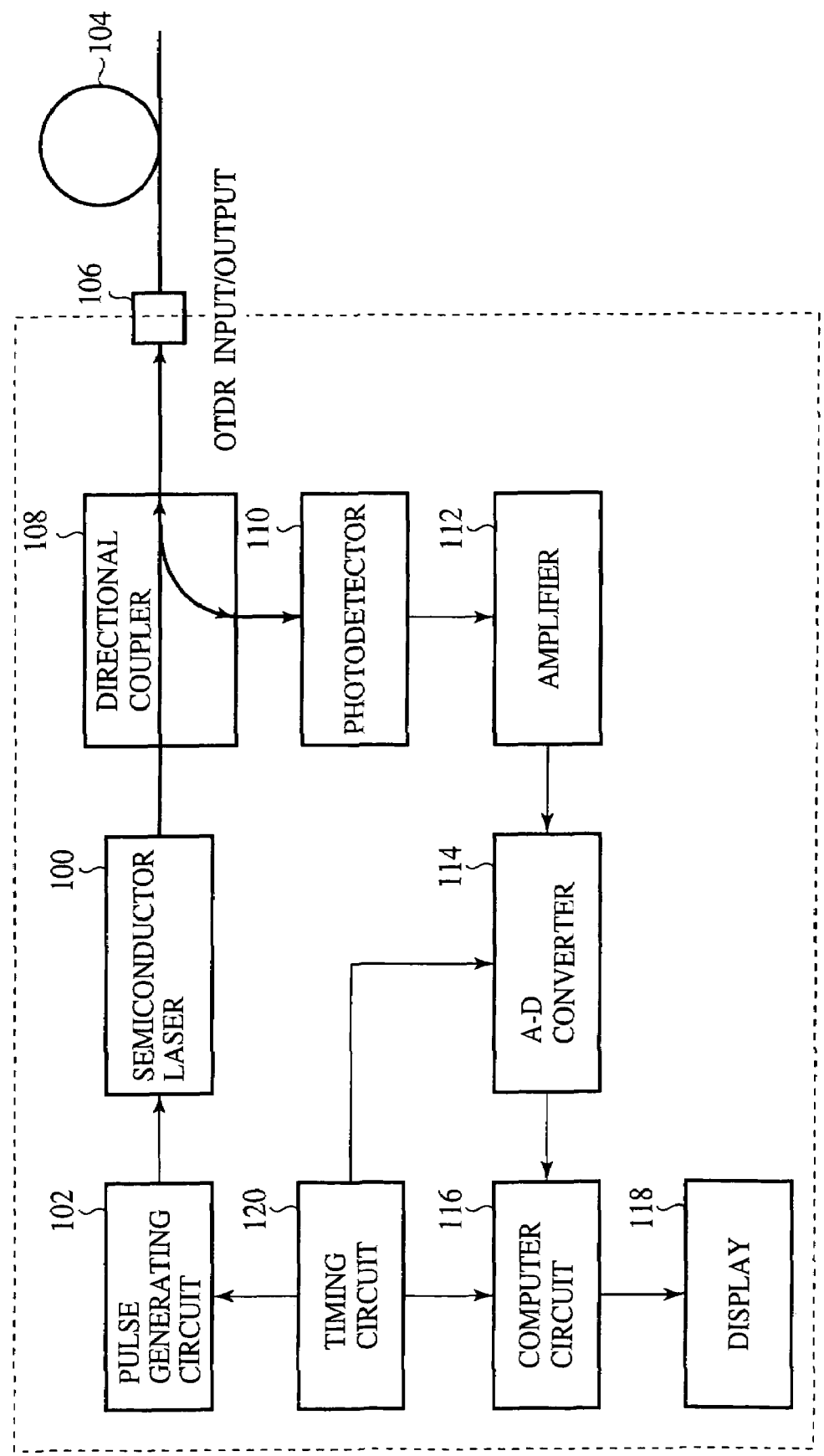
FIG. 8 is a block diagram of the structure of the conventional optical pulse testing apparatus.
Figure 9:
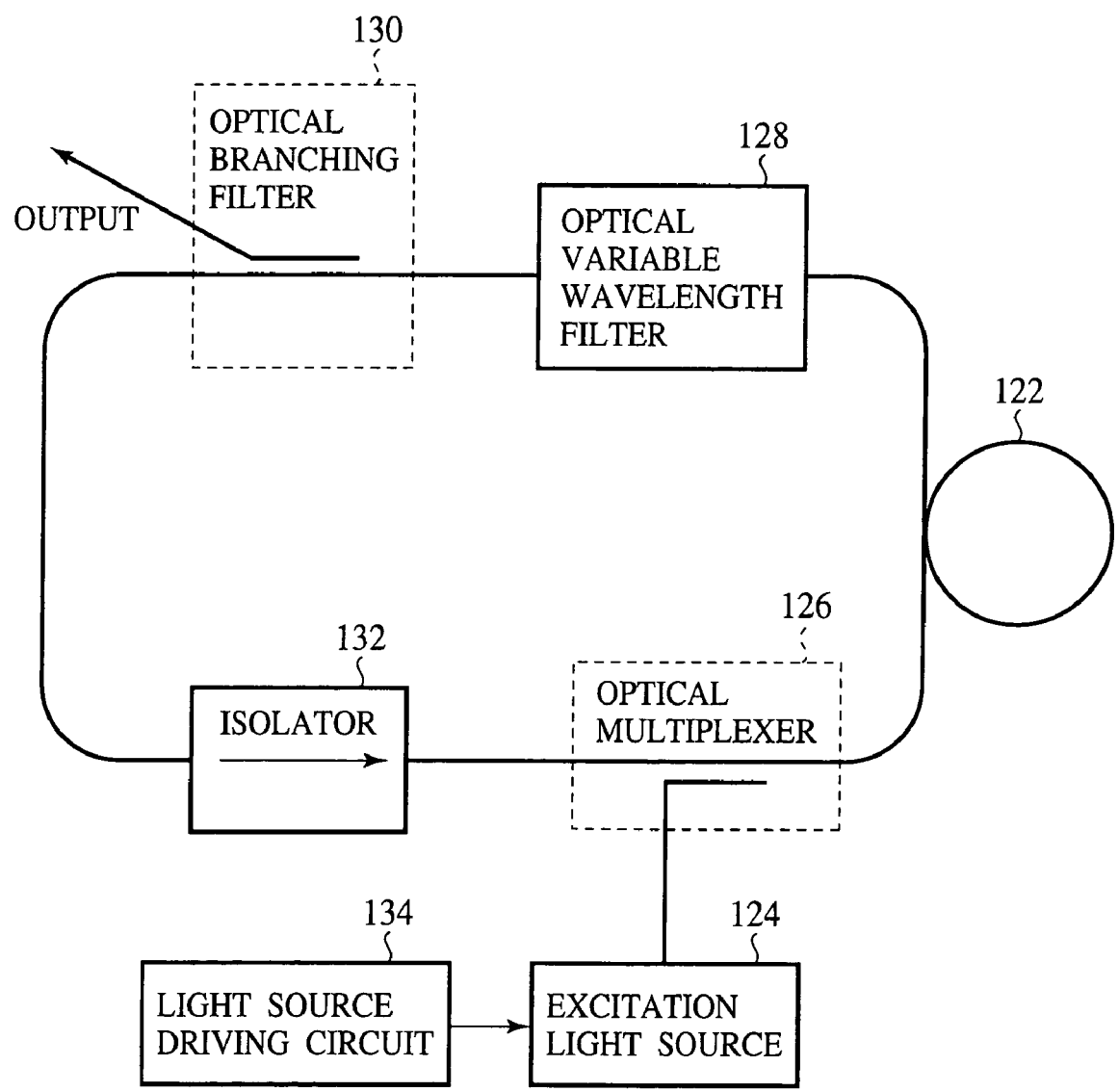
FIG. 9 is a block diagram of the structure of the conventional ring laser.
Figure 10A:
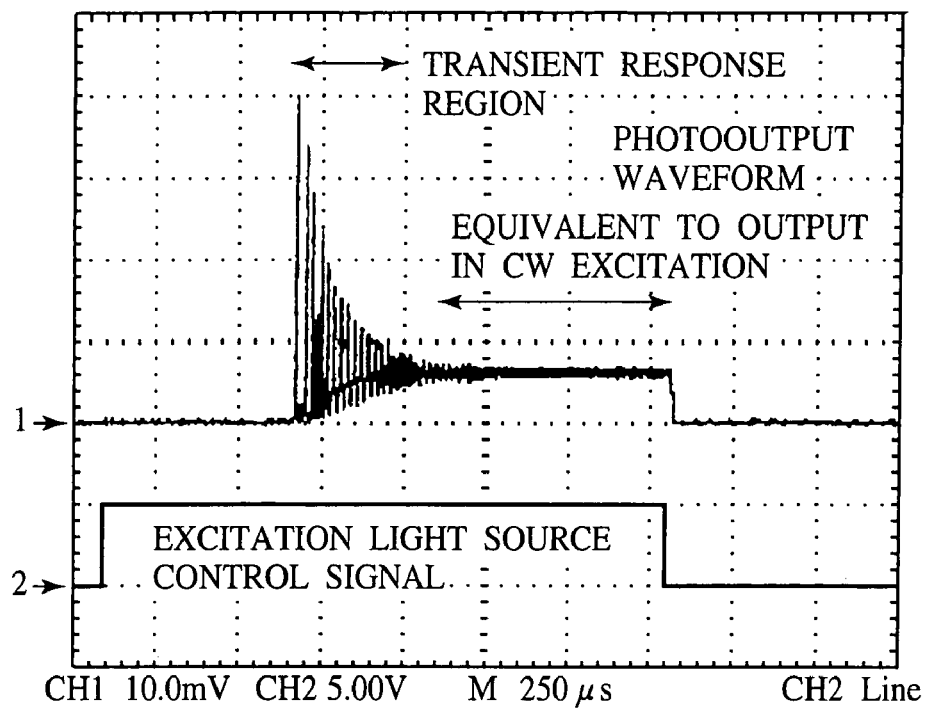
FIGS. 10A–10B are graphs showing an example of outputs of the conventional ring laser.
Figure 10B:
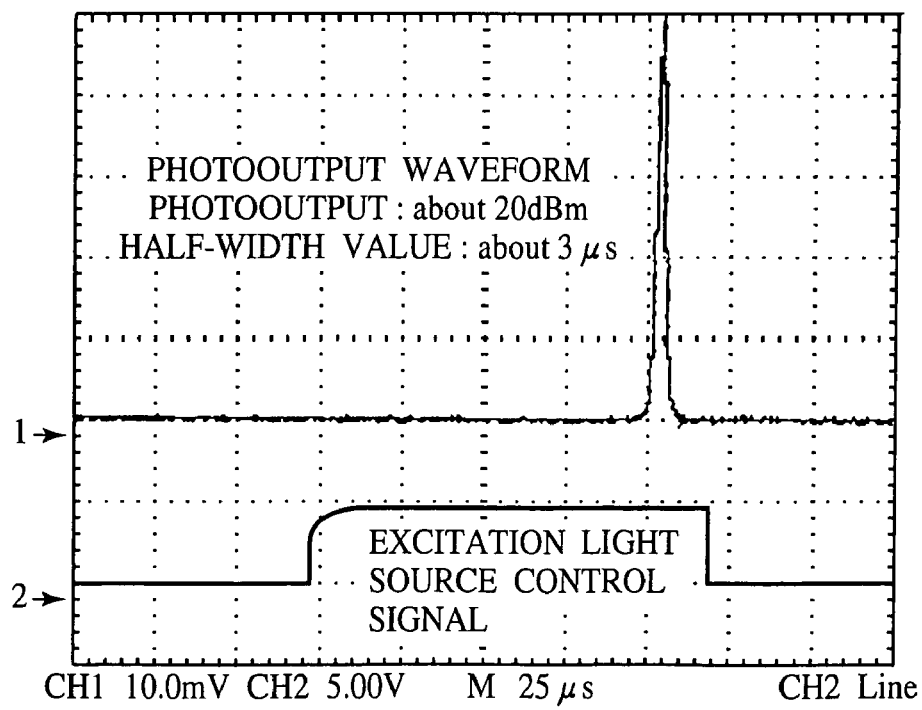
Figure 11:
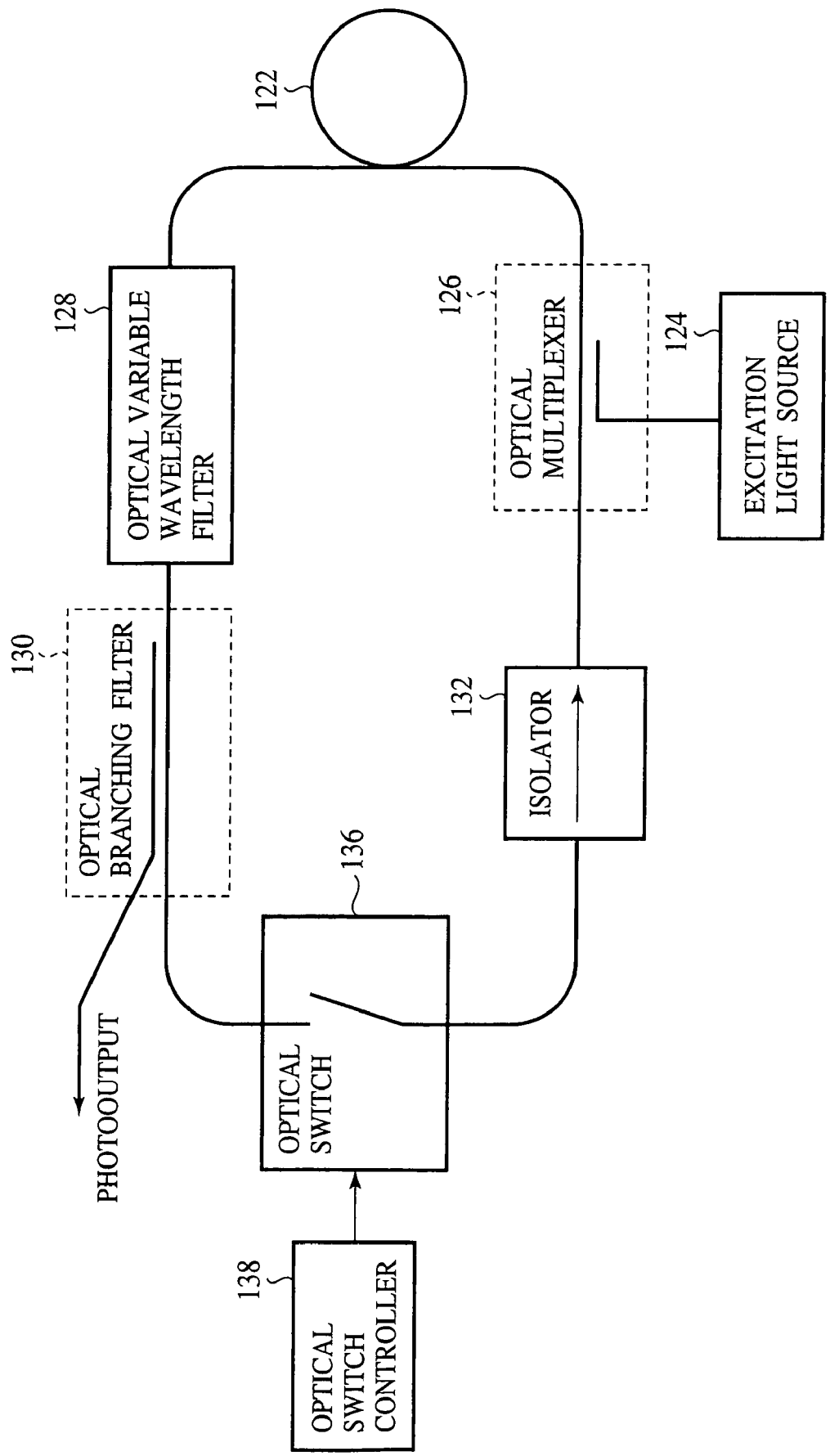
FIG. 11 is a bock diagram of the structure of conventional ring laser which can generate single pulse outputs.

The optical pulse generator, and the optical pulse testing apparatus and method according to a fourth embodiment of the present invention will be explained with reference to FIG. 7. FIG. 7 is a schematic diagram showing a structure of the optical pulse generator according to the present embodiment. The same members of the present embodiment as those of the optical pulse generator and the optical pulse testing apparatus according to the third embodiment are represented by the same reference numbers to simplify their explanation.

In the optical pulse generator according to the third embodiment, an excitation pulse width is changed by a wavelength or a repetition frequency so as to output a single pulse from the optical pulse generator. Accordingly, control signals for controlling the optical switch controller 50 as well must be changed. It is impossible to generate optical pulses of a pulse width larger than a pulse width determined by parameters of the optical parts constituting the optical pulse generator. The present embodiment solves this problem.

As shown in FIG. 7, the structure of the optical pulse generator according to the present embodiment is substantially the same as that of the third embodiment. In the present embodiment, furthermore, an optical fiber 30 of the optical pulse generator 10 has an optical fiber 52 so as to generate optical pulses of a required wide pulse width. Because of the optical fiber 52, a time during which light circulates through the optical fiber 30 is extended by a time during which the light circulates through the optical fiber 52, whereby increasing the pulse width of the optical pulses. A length of the optical fiber 52 is changed to adjust a pulse width of the optical pulses which can be emitted by the optical pulse generator.

Furthermore, a photodetector 40 detects intensities of the optical pulses circulating through the optical fiber 30 and the optical fiber 52 via an optical branching filter 42. Based on the result of the detection, a timing circuit 12 of the optical pulse testing apparatus controls the optical switch controller 50 so that when a required optical pulse is detected, the optical switch 48 is turned on for a time interval equal to the required pulse width. At this time, when a delay time is present from the input of the control signal to the optical switch 48 to the actual operation of the optical switch 48, it is preferable to use the optical fiber 52 of a length considering the delay time.

As described above, in the present embodiment, the optical switch 48 is changed over when a required optical pulse has been obtained. Accordingly, it is not necessary to perform a complicated operation to synchronize the light source driving circuit 46 for driving the excitation light source 32 with the optical switch 48.

As described above, according to the present embodiment, the optical pulse generation by the optical pulse generator is detected, and based on the result of the detection, the control of the optical pulse testing apparatus is performed. Thus, the optical pulse generator and the optical pulse testing apparatus can be constituted without using expensive optical parts and can perform the measurement of the light transmission states of optical fibers without requiring complicated device control.

Modified Embodiments

The present invention is not limited to the above-described embodiments and can cover other various modifications.

For example, in the above-described embodiments, the optical pulse generator according to the present invention is used as the pulse light source of the optical pulse testing apparatus, but the optical pulse generator according to the present invention is not limited to the application to the pulse light source of the optical pulse testing apparatus. It is possible that in a device using the optical pulse generator according to the present invention as the pulse light source, the signals detected by the photodetector 40 are used, as required, as timing signals for controlling the device.

In the optical pulse generator, and the optical pulse testing apparatus and method according to the present invention, excitation optical pulses for exciting an optical fiber included in a ring optical path are supplied to the optical fiber; and when the optical pulses circulating through the ring optical path are branched to output the optical pulses, the optical pulses circulating through the ring optical path are detected to control the operation of the optical pulse testing apparatus based on the result of the detection. The optical pulse generator can be constituted without using expensive optical parts and requires no complicated device control, and is useful in the optical pulse testing apparatus and method.

The invention claimed is:

1. An optical pulse generator comprising:
a ring optical path including an optical fiber doped with a rare earth element;
an optical fiber excitation means which supplies an excitation optical pulse to the optical fiber for exciting the optical fiber;
an optical pulse branching means for branching a circulating optical pulse which is circulating through the ring optical path, so as to emit an output optical pulse;
an optical pulse detecting means which detects the circulating optical pulse which is circulating through the ring optical path to obtain a signal indicative of light intensity and timing of the circulating optical pulse; and
a means for controlling operation timings of the optical fiber excitation means to supply the excitation optical pulse to the optical fiber based on the signal detected by the optical pulse detecting means.

2. An optical pulse generator according to claim 1, wherein the optical fiber excitation means stops supplying the excitation optical pulse to the optical fiber when the optical pulse detecting means detects the signal indicative of a required light intensity or a required peak output of the circulating optical pulse.

3. An optical pulse generator according to claim 1, further comprising:
an optical switch for controlling a pulse width of the output optical pulse; and
an optical switch control means for synchronizing the operation of the optical switch and the emission of the excitation optical pulse by the optical fiber excitation means.

4. An optical pulse generator according to claim 1, wherein the optical fiber has a total length which permits at least a required pulse width of the output optical pulses; and wherein the optical pulse generator further comprises:
an optical switch for controlling a pulse width of the output optical pulse; and
an optical switch control means for controlling the operation of the optical switch, based on a detection result of the optical pulse detecting means, to make a pulse width of the output optical pulse a required width.

5. An optical pulse testing apparatus comprising:
an optical pulse generator including a ring optical path made of an optical fiber doped with a rare earth element an optical fiber excitation means for supplying an excitation optical pulse to the optical fiber for exciting the optical fiber, and an optical pulse branching means for branching the circulating optical pulse circulating through the ring optical path to emit a probe optical pulse, the optical pulse generator entering supplying the probe optical pulse from the optical pulse branching means to an optical fiber-to-be-measured;
a reflected light detecting means for detecting a reflected light of the probe optical pulse supplied to the optical fiber-to-be-measured; and
an analyzing means for analyzing a light transmission state of the optical fiber-to-be-measured based on a detection result of the reflected light detection means;
wherein the optical pulse generator further includes an optical pulse detecting means for detecting the circulating optical pulse which is circulating through the ring optical path to obtain a signal indicative of light intensity and generation timing of the circulating optical pulse, and
wherein the optical pulse testing apparatus further includes a control means for controlling the timing of the analyzing means starting the analysis based on a detected result of the optical pulse detecting means.

6. An optical pulse testing apparatus according to claim 5, wherein the optical fiber excitation means stops supplying the excitation optical pulse to the optical fiber when the optical pulse detecting means detects the signal indicative of a required light intensity or a required peak output of the circulating optical pulse.

7. An optical pulse testing apparatus according to claim 5, wherein the optical pulse generator further comprises:
an optical switch for controlling a pulse width of the probe optical pulse; and
an optical switch control means for synchronizing the operation of the optical switch and the emission of the excitation optical pulse by the optical fiber excitation means.

8. An optical pulse testing apparatus according to claim 5, wherein the optical fiber of the ring optical path has a total length which permits the probe optical pulse to have at least a required pulse width, and wherein the optical pulse generator further comprises:
an optical switch for controlling a pulse width of the probe optical pulses; and
a switch control means for controlling the operation of the optical switch to make a pulse width of the probe optical pulse is a required width based on a detected result of the optical pulse detecting means.

9. An optical pulse testing method comprising the following steps of:
supplying a probe optical pulse to an optical fiber-to-be-measured;
detecting a reflected light of the probe optical pulse supplied to the optical fiber-to-be-measured; and
analyzing a light transmission state of the optical fiber-to-be-measured based on a detection result of the reflected light;
wherein said probe optical pulse is generated by the following steps of:
supplying an excitation optical pulse into a ring optical path including an optical fiber doped with a rare earth element to excite the optical fiber;
circulating the optical pulse through the ring optical path and branching out the optical pulse as the probe optical pulse; and
detecting the circulating optical pulse circulating through the ring optical;

wherein a timing of starting the analysis of the light transmission state of the optical fiber-to-be-measured being is controlled based on a detection result of the circulating optical pulse.

10. An optical pulse testing method according to claim 9, wherein the of step of supplying the excitation optical pulse to the ring optical path is stopped after a required light intensity or a peak output of the circulating optical pulse is detected.

11. An optical pulse testing method according to claim 9, further comprising a step of controlling a pulse width of the probe optical pulse wherein the control of the pulse width of the probe optical pulse and the entry supply of the excitation optical pulse to the ring optical path are synchronized with each other.

12. An optical pulse testing method according to claim 9, wherein the optical fiber of the ring optical path has a total length which permits the probe optical pulse to have at least a required pulse width, and wherein a pulse width of the probe optical pulse is controlled based on a detection result of the circulating optical pulse.

* * * * *